United States Patent
St. Jacques, Jr. et al.

(10) Patent No.: US 9,007,623 B2
(45) Date of Patent: Apr. 14, 2015

(54) SYSTEM AND METHOD FOR ENABLING A MOBILE CUSTOMIZABLE EIP INTERFACE TO ACCESS MULTI-FUNCTION DEVICES

(75) Inventors: Robert St. Jacques, Jr., Fairport, NY (US); Hua Liu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 415 days.

(21) Appl. No.: 13/071,822

(22) Filed: Mar. 25, 2011

(65) Prior Publication Data

US 2012/0243029 A1    Sep. 27, 2012

(51) Int. Cl.
*G06F 3/12* (2006.01)
*H04N 1/00* (2006.01)

(52) U.S. Cl.
CPC ............ *G06F 3/1204* (2013.01); *G06F 3/1226* (2013.01); *G06F 3/126* (2013.01); *G06F 3/1292* (2013.01); *H04N 1/00307* (2013.01); *H04N 2201/0039* (2013.01); *H04N 2201/0049* (2013.01); *H04N 2201/0055* (2013.01); *H04N 2201/0094* (2013.01)

(58) Field of Classification Search
USPC ........... 358/1.1–3.29; 715/200–277, 700–866
See application file for complete search history.

(56) References Cited

U.S. PATENT DOCUMENTS

| | | | |
|---|---|---|---|
| 7,006,836 B2 | 2/2006 | Yokoyama | |
| 7,142,333 B2 | 11/2006 | Struble | |
| 7,528,977 B2 | 5/2009 | Hull et al. | |
| 7,599,851 B2* | 10/2009 | Frengut et al. | 705/14.66 |
| 2005/0071763 A1 | 3/2005 | Hart et al. | |
| 2008/0051032 A1 | 2/2008 | Hashimoto | |
| 2010/0094925 A1* | 4/2010 | St Jacques et al. | 709/202 |
| 2010/0328705 A1* | 12/2010 | Kibler et al. | 358/1.15 |
| 2011/0040823 A1* | 2/2011 | Liu et al. | 709/203 |
| 2011/0058202 A1* | 3/2011 | St. Jacques et al. | 358/1.13 |
| 2011/0216333 A1* | 9/2011 | Rabb | 358/1.9 |
| 2012/0110102 A1* | 5/2012 | Frentzel-Beyme et al. | 709/206 |

* cited by examiner

*Primary Examiner* — Marcellus Augustin
(74) *Attorney, Agent, or Firm* — Kermit D. Lopez; Luis M. Ortiz; Ortiz & Lopez, PLLC

(57) ABSTRACT

A system for enabling at least one mobile device to communicate with at least one multi-function printer over a network, including at least one processor and a computer-readable storage medium in communication with the at least one processor, wherein the computer-readable storage medium comprises one or more programming instructions for: registering the at least one mobile device with a web-based service; accessing, via the at least one mobile device, a user interface program providing a plurality of Extensible Interface Platform (EIP) options and services; prioritizing, sorting, and ranking the plurality of EIP options and services based on user preference so as to create a customized mobile EIP User Interface (UI); and enabling the customized mobile EIP UI of the at least one mobile device to communicate with and be executed on the at least one multi-function printer.

18 Claims, 3 Drawing Sheets

SYSTEM AND METHOD FOR ENABLING A MOBILE CUSTOMIZABLE EIP INTERFACE TO ACCESS MULTI-FUNCTION DEVICES

BACKGROUND

1. Field of Related Art

The present disclosure is generally related to multi-function devices, and more particularly, to a system and method for enabling a mobile customizable Extensible Interface Platform (EIP) application and/or interface to access one or more multi-function devices.

2. Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

"Multi-function" machines or multifunction devices (MFDs) have become familiar in offices and in home computing environments. Whereas, previously, functions such as copying, printing, and facsimile transmission have been performed by single dedicated copiers, printers, and facsimiles respectively, a multi-function machine is typically capable of providing all such functions and more in a single machine. Typically, such a multi-function machine includes a single print engine, which may serve to output copies, prints, or received facsimiles; as well as a single input scanner which may serve to record data from original images for use in copying, facsimile transmission, and retention of input image data to a predetermined location in a computer memory.

MFDs typically have the necessary hardware, such as a Local Area Network (LAN) card, and software, such as a network operating system, to enable network accessibility. MFDs also typically have ports, such as Universal Serial Bus (USB) ports, or interfaces, such as a radiofrequency (RF) or Bluetooth™ compatible interface, through which a peripheral may be connected.

Additionally, Extensible Interface Platform (EIP) services may be registered with individual MFDs. As such, the registration is specific to one MFD and the results appear in the "Custom Services" section of the MFD's local User Interface (UI). Users must switch to the "Services" screen, and in many cases choose "Custom Services," and then scroll through a potentially large list of services to find the service that the users desire. The EIP services offered, and the location at which they appear, most likely differ from one MFD to the next, especially across product families.

Moreover, EIP services generally interact with the MFD by calling web services against the "local host" to, for example, install scan templates, remove scan templates, scan, print, etc. Finally, some MFDs do not feature robust enough displays to even allow for custom EIP services to be featured in the local UI, and so do not support custom services at all. Accordingly, there is need in the art for methods and systems to enable quick and efficient access to multi-function devices and support for customized EIP services.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A system is presented for enabling at least one mobile device to communicate with at least one multi-function printer over a network, including at least one processor and a computer-readable storage medium in communication with the at least one processor, wherein the computer-readable storage medium comprises one or more programming instructions for: registering the at least one mobile device with a web-based service; accessing, via the at least one mobile device, a user interface program providing a plurality of Extensible Interface Platform (EIP) options and services; prioritizing, sorting, and ranking the plurality of EIP options and services based on user preference so as to create a customized mobile EIP User Interface (UI); and enabling the customized mobile EIP UI of the at least one mobile device to communicate with and be executed on the at least one multi-function printer.

A method is presented for enabling at least one mobile device to communicate with at least one multi-function printer over a network, including registering the at least one mobile device with a web-based service; accessing, via the at least one mobile device, a user interface program providing a plurality of Extensible Interface Platform (EIP) options and services; prioritizing, sorting, and ranking the plurality of EIP options and services based on user preference so as to create a customized mobile EIP UI; and enabling the customized mobile EIP UI of the at least one mobile device to communicate with and be executed on the at least one multi-function printer.

A communications network is presented including a plurality of multi-function printer machines linked through the communications network and a plurality of mobile devices in electrical communication with the plurality of multi-function printer machines, each of the plurality of mobile devices having a customized mobile Extensible Interface Platform (EIP) application created by allowing users to prioritize, sort, and rank a plurality of EIP options and services based on user preferences; wherein at least one of the customized mobile EIP UI communicates with and is executed on at least one of the plurality of multi-function printer machines.

BRIEF DESCRIPTION OF THE DRAWINGS

These and other advantages will become more apparent from the following detailed description of the various embodiments of the present disclosure with reference to the drawings wherein.

Figure 1:
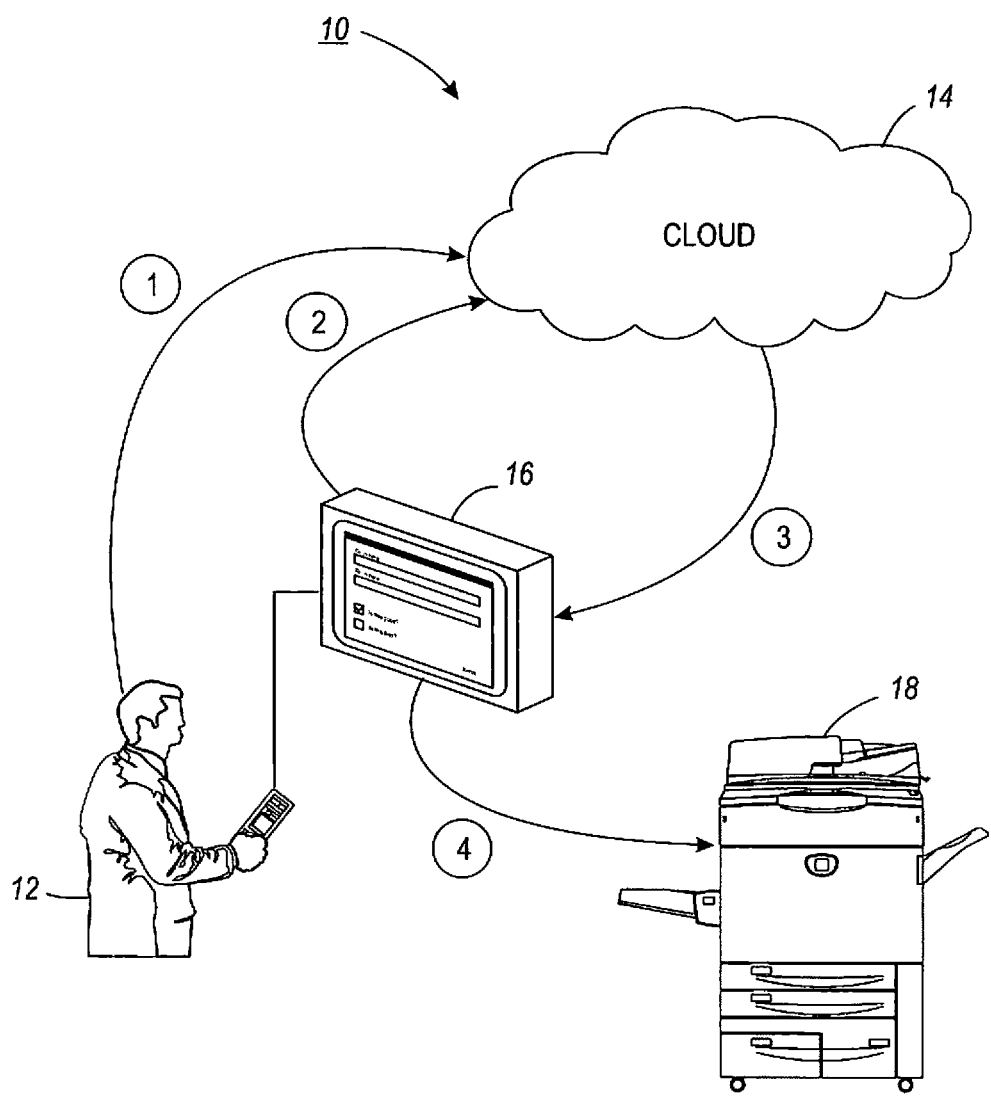
FIG. 1 illustrates a system diagram including a multi-function device in electrical communication with a mobile device having a custom mobile EIP User Interface (UI), in accordance with the present disclosure.

The figures depict preferred embodiments of the present disclosure for purposes of illustration only. One skilled in the art will readily recognize from the following discussion that alternative embodiments of the structures and methods illustrated herein may be employed without departing from the principles of the present disclosure described herein.

DETAILED DESCRIPTION

Particular embodiments of the present disclosure are described herein below with reference to the accompanying drawings. In the following description, well-known functions or constructions are not described in detail to avoid obscuring the present disclosure in unnecessary detail.

Various modifications to the preferred embodiment, disclosed herein, will be readily apparent to those of ordinary skill in the art and the disclosure set forth herein may be applicable to other embodiments and applications without departing from the spirit and scope of the present specification and the claims hereto appended. Thus, the present specification is not intended to be limited to the embodiments described, but is to be accorded the broadest scope consistent with the disclosure set forth herein.

The present disclosure is described below with reference to block diagrams and/or flowchart illustrations of methods, apparatus (systems and/or devices) and/or computer program products according to embodiments of the disclosure. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

The exemplary embodiments of the present disclosure propose a system where users maintain a custom EIP "Custom Services" screen on their mobile device (or electronic device, as defined herein) that contains the services that the user is interested in, in the order in which the user decides that they should be displayed. Users can then "connect" their mobile device to a specific Multifunction Printer (MFP) with the help of a back end service that allows the EIP applications of the customizable mobile EIP UI to run in their mobile browser to interact with the specific MFP via web service calls.

The exemplary embodiments of the present disclosure further propose a system and method where parts of an EIP UI may be distributed, off the MFP, to allow users to create a highly customized, portable "EIP Screen" on their mobile device. The system seeks to address many of the potential problems of the existing EIP platform by allowing users to carry their User Interface (UI) with them, connect it with any supported MFP, and access services on the MFP in the same way, with the same look and feel, every time, regardless of the current registration status on the MFP of choice. Note that in most instances "Mobile EIP Application" refers to an application running on a mobile device. This does not preclude the user from accessing some functionality by other means (i.e., a browser on a workstation).

Prior to describing the present disclosure in further detail, it will first be helpful to define various terms that will be used throughout the following discussion. For example:

The term "print" is overloaded to mean at least sending one or more documents to the printer or MFP through any one of a multitude of ways. Moreover, the term "printer" may at least refer to any device that accepts text and graphic output from any type of computing device and transfers the information to any printable medium. A "printer" may refer to at least any type of xerographic, solid ink, liquid ink, cut sheet or web-based device used to print onto a wide array of printable media. The term "printer" as used herein encompasses at least any apparatus, such as a digital copier, bookmaking machine, facsimile machine, multi-function machine, etc. which performs a print outputting function for any purpose.

The term "multi-function machine" or "MFD" or "MFP" may refer at least to any machine that connects to either a computing device and/or network and performs one or more of the following functions or tasks: print, scan, copy, and/or fax. Digital copiers, fax machines, printers, and scanner combinations are all examples of MFDs. The term "MFD" may further refer to at least any hardware that combines several functions in one unit. For instance, an MFD may be at least a standalone printer or any type of standalone machine/device/apparatus/component. For example, an MFD or MFP may be at least one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics may apply in any type of entertainment, communications, home, and/or office capacity. Thus, the term "MFDs" or "MFPs" may refer to any type of electronics suitable for use with a circuit board and intended to be used by a plurality of individuals for a variety of purposes. The terms "multi-function machine" and "MFD" and "MFP" may be used interchangeably throughout the specification.

MFDs or MFPs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "storage" may refer to at least data storage. "Data storage" may at least refer to any article or material (e.g., a hard disk) from which information is capable of being reproduced, with or without the aid of any other article or device. "Data storage" may at least refer to the holding of data in an electromagnetic form for access by a computer processor. Primary storage is data in random access memory (RAM) and other "built-in" devices. Secondary storage is data on hard disk, tapes, and other external devices. "Data storage" may also at least refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "application" in the disclosed embodiments refers to at least a program designed for end users of a computing device, such as a word processing program, a database program, a browser program, a spreadsheet program, a gaming program, and the like. An application is distinct from systems programs, which consist of low-level programs that interact with the computing device at a very basic level, such as an operating system program, a compiler program, a debugger program, programs for managing computer resources, and the like.

The term "processing" may at least refer to determining the elements or essential features or functions or processes of one or more multi-function devices or MFPs or electronic devices or mobile devices for computational processing. The term "process" may further refer to tracking data and/or collecting data and/or manipulating data and/or examining data and/or updating data on a real-time basis in an automatic manner and/or a selective manner and/or manual manner (continuously, periodically or intermittently).

The term "task" refers to at least a print, scan, copy, and/or fax job or any type of function that may be performed by an MFD or MFP. The term "task" may also refer to an execution path through address space, such as a set of program instructions that are loaded in a data storage means. The term "task" may also at least refer to a basic unit of programming that an operating system controls and depending on how the operating system defines a task in its design, this unit of programming may be an entire program or each successive invocation of a program. The term "task" may be used interchangeably with the term "function."

The term "cloud" refers to "cloud computing." Cloud computing may refer to at least computation, software, data access, and storage services that do not require end-user knowledge of the physical location and configuration of the system that delivers the services. Cloud computing may also refer to a model for enabling convenient, on-demand network access to a shared pool of configurable computing resources (e.g., networks, servers, storage, applications, and services) that may be rapidly provisioned and released with minimal management effort or service provider interaction.

The term "EIP Application" may refer to EIP options and services, whereas the term "EIP Service" may refer to a specific set of services on the MFD that expose functions to the EIP Applications (e.g., print, scan, create scan template, etc.). The term "Customized Mobile EIP User Interface (UI)" may at least refer to a plurality of EIP Applications, each of which encapsulates a pre-defined workflow.

The term "electronic device" may at least refer to one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics may apply in any type of entertainment, communications, home, and/or office capacity. Thus, the term "electronic device" may at least refer to any type of electronics suitable for use with a circuit board and intended to be used by a plurality of individuals for a variety of purposes.

Additionally, "electronic devices" may refer to at least, or may include but are not limited to, a mouse, keyboard, Bluetooth™ adapter, global positioning system (GPS) receiver, remote control, audio module, user interface module, electronic-book reader module, radio frequency identification (RFID) reader, barcode reader, digital projector, universal serial bus stick, magnetometer, fingerprint reader, current/voltage measuring device, electrocardiogram, pulse measuring device, and stethoscope. Moreover, "electronic devices" may refer to at least, or may include but are not limited to, an electronic book, displays, television sets, electronic paper, watches, electronic calculators, cellular phones, personal digital assistants, cellular telephone, view finder, direct view type video tape recorder, car navigation system, pager, electronic notebook, electric calculator, word processor, work station, picture telephone, point of sale (POS) terminal(s), point-of-entry (POE) terminal(s) and any type of electrical or mechanical or electromechanical apparatus/system/configuration with one or more touch panels.

Within this disclosure, the term "user" may also include, in addition to human users: computers, automated systems, controllers, robotic devices, and other electro-mechanical devices, systems, configurations/apparatuses using software (or code).

Embodiments will be described below while referencing the accompanying figures. The accompanying figures are merely examples and are not intended to limit the scope of the present disclosure.

Referring to FIG. 1 a system diagram including a multi-function device in electrical communication with a mobile device having a custom mobile EIP UI, in accordance with the present disclosure is presented.

The system diagram 10 depicts a mobile EIP UI framework. The system 10 includes a user 12 communicating with a cloud 14 via a display 16 (e.g., a cell phone display or any electronic device display) in order to access a multi-function printer machine or MFP 18. For example, the user 12 may register with the cloud 14 and purchase one or more EIP applications. The user 12 may access the one or more EIP applications via a mobile device and the browser 16 on the mobile device may be used to request web pages or other electronic data/information from the cloud 14. The cloud 14 may respond to the request of electronic information by displaying such electronic information on the browser or display 16 of the mobile device (or any other electronic device having a display). The browser 16 may execute a software program or code to allow access to the MFP 18 through one or more web service calls.

As such, the mobile device is permitted to access a user interface program (or software or code, as defined herein) providing a plurality of Extensible Interface Platform (EIP) options and services. The user may prioritize, sort, and rank the plurality of EIP options and services based on user preference so as to create a customized mobile EIP User Interface (UI). The customized mobile EIP UI is then enabled or permitted to communicate with and be executed on the at least one multi-function printer.

Additionally, the customized mobile EIP UI and the MFP 18 may each include or be associated with at least one processor. The processor may include at least one conventional processor or microprocessor that interprets and executes instructions. The processor may be a general purpose processor or a special purpose integrated circuit, such as an ASIC (application-specific integrated circuit), and may include more than one processor sections.

Moreover, the customized mobile EIP UI and the MFP 18 may each include or be associated with at least one memory unit or memory module. The memory may be a random access memory (RAM) or another type of dynamic storage device that stores information and instructions for execution by processor. The memory may also include a read-only memory (ROM) which may include a conventional ROM device or another type of static storage device that stores static information and instructions for the processor located within the MFP 18. The memory may be any memory device that stores data for use by system 10, for example, a data storage system as defined herein.

Additionally, MFP 18 may include input/output devices (I/O devices) that may include one or more conventional input mechanisms that permit a user to input information to the system 10, such as a microphone, touchpad, keypad, keyboard, mouse, pen, stylus, voice recognition device, buttons, etc., and output mechanisms such as one or more conventional mechanisms that output information to the user, including a display, one or more speakers, a storage medium, such as a memory, magnetic or optical disk, disk drive, a printer device, etc., and/or interfaces for the above.

Figure 2:
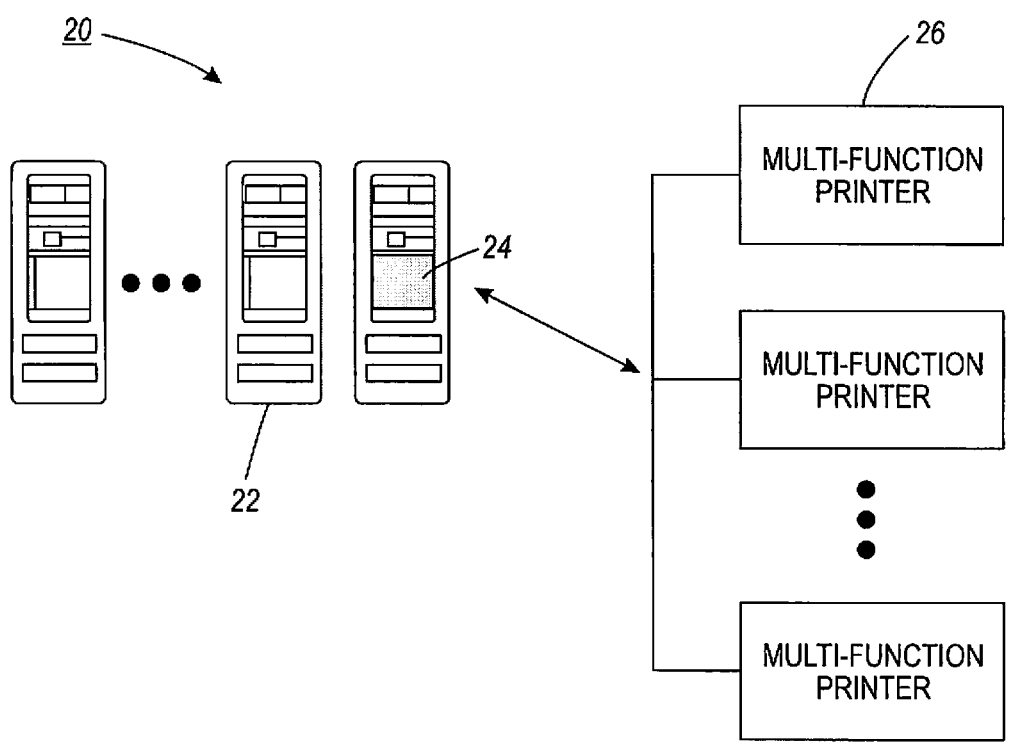
FIG. 2 illustrates a system diagram including a plurality of multi-function devices in electrical communication with a plurality of mobile devices connected via a network, each of the plurality of mobile devices having at least one custom mobile EIP UI, in accordance with the present disclosure.

Referring to FIG. 2, a system diagram including a plurality of multi-function devices in electrical communication with a plurality of mobile devices connected via a network, each of the plurality of mobile devices having at least one custom mobile EIP UI, in accordance with the present disclosure is presented.

The system 20 may include a plurality of mobile devices 22, each having a customized mobile EIP UI 24. The customized mobile EIP UI 24 of each of the plurality of mobile devices 22 may communicate with and be executed on the plurality of MFPs 26.

For example, users of the mobile devices 22 may register with an Internet service (e.g., hosted by an entity or service provider, as defined below), to create an account that would uniquely identify that user. User registration information would likely need to contain a username and password that could be used by the user to log in from their mobile device(s) 22. Additionally, contact and billing information would also be required.

Once registered with the Internet service, the customized mobile EIP UI users would then be able to select custom services that the users would like associated with their account. Users would have access to a web-based UI that allows such users to browse, search, and purchase EIP services directly from any entity or service provider or another vendor for their account. It is also conceivable that such a system would even allow users to register their own (or third party) custom services hosted elsewhere using typical EIP registration information.

Once the users have one or more services registered, the users may be allowed to prioritize, sort, and/or rank the services or options in any order that they deem appropriate. This ranking is used to display the services in the "Mobile EIP" UI, and thus, should be consistent even across different mobile devices (e.g., even if the number of services displayed on the screen at one time should change from device to device). Typical users are likely to access the system from one or two devices most of the time (e.g. their mobile phone or other portable electronic device).

Once the users have connected to a specific MFP 26, the user interface 24 should mimic the "Custom Services" screen of one or more MFPs 26. That is, the user interface 24 should display a series of buttons with icons and labels showing users registered and custom services. Note that a specific service may be disabled or removed depending on whether or not it requires features available on the one or more MFPs 26 to which the users have connected.

Moreover, the exemplary embodiments of the present disclosure propose that users be able to perform at least one or more of the following actions via the customized mobile EIP UI:

Add Printer(s):
Users 12 may add new printers in a number of ways. For example, by using a camera in the mobile device, the user 12 may photograph a QR Code (a two dimensional barcode) on the front of the MFP 18 and send it to the cloud 14 (see FIG. 1). The cloud 14 may respond with information describing the MFP 18 which may include, but is not limited to: the IP Address of the MFP 18, the hostname of the MFP 18, the name of the wireless network through which the MFP 18 is accessible, any network security information required to access the wireless network, the product family and/or capabilities of the MFP 18, etc. The user 12 may manually enter the hostname or IP address of the MFP 18 or the user 12 may discover the MFP 18 from the mobile device browser 16.

Browse Printer(s):
Users may browse and sort MFPs that have been previously added.

Designate Default Printer(s):
Users may be able to designate a global "preferred" printer, or designate preferred printers per location using the GPS functionality of their mobile device to identify the current location and dynamically switch between favorites.

Remove Printer(s):
Users may be able to delete unwanted printers from their favorites list.

Connect to Printer(s):
The user may be able to choose a printer to connect to from his/her favorites list. The list of available printers from which the user may choose may be filtered based on location and accessibility (e.g., a printer that requires access to a specific wireless network may not appear if that network is not within range of the mobile device). When connecting to an MFP, the Mobile EIP UI may use the associated network information to automatically connect to the WiFi network through which the MFP is accessible (if not already connected).

Prioritizing, sorting and ranking MFPs may be based on a number of factors or options or services. For example, MFPs loaded with different types of paper may be weighted differently in some embodiments, as a function of a level of recycled content. For example, one MFP may be loaded with paper containing 15% recycled material where another printer may contain paper with 50% recycled material. As such, a user may prioritize or rank an MFP based on such a criterion.

For example, MFPs may also be checked for availability. In some embodiments availability is based on the amount of print jobs stored and ready for processing and/or printing within a given print queue for an individual MFP or an associated network print spooler. As such, a user may prioritize or rank an MFP based on such a criterion. In some embodiments, print jobs may also be balanced between MFPs based on queue magnitude as well as the MFPs energy and resource weighted attributes. For example, a first MFP may consume less energy and resources for a selected print operation, however there are several documents in that MFP's queue. In such a scenario, a second less-preferred MFP, which consumes more energy and resources, may nonetheless be selected as the MFP destination because its queue contains, for instance, only two documents (to prevent an excessive wait time for the print operation).

For example, in another embodiment, the MFP also enables a prioritization of print jobs depending upon ink volumes present, thus allowing an overall reduction in printing costs to the owner, time savings to the operation staff, and significantly improved print-job throughput and turnaround times. As such, the mobile EIP UI may be customized in any manner based on any criteria or attributes or options or services available by the MFP or service provider of the MFP.

In another exemplary embodiment, the customized mobile EIP UI may be associated with past historical data or with future, anticipated historical data. The information gathered may be stored separately in a local or remote database or storage unit/module for further processing. This may be a unique database designed solely for storing and analyzing such different types of data/information requested. Also, once a history of preferences is collected and stored for each of the plurality of users of the MFPs, such history information may be evaluated in the future for determining which preferences may be desired in the future. In other words, the preferences may be stored and later compared against each other and ranked in order of most likely to be preferred in the future or least likely to be preferred in the future. In other words, the system 10 of FIG. 1 and the system 20 of FIG. 2 are capable of making future predictions of a user's preferences related to the MFDs.

Figure 3:
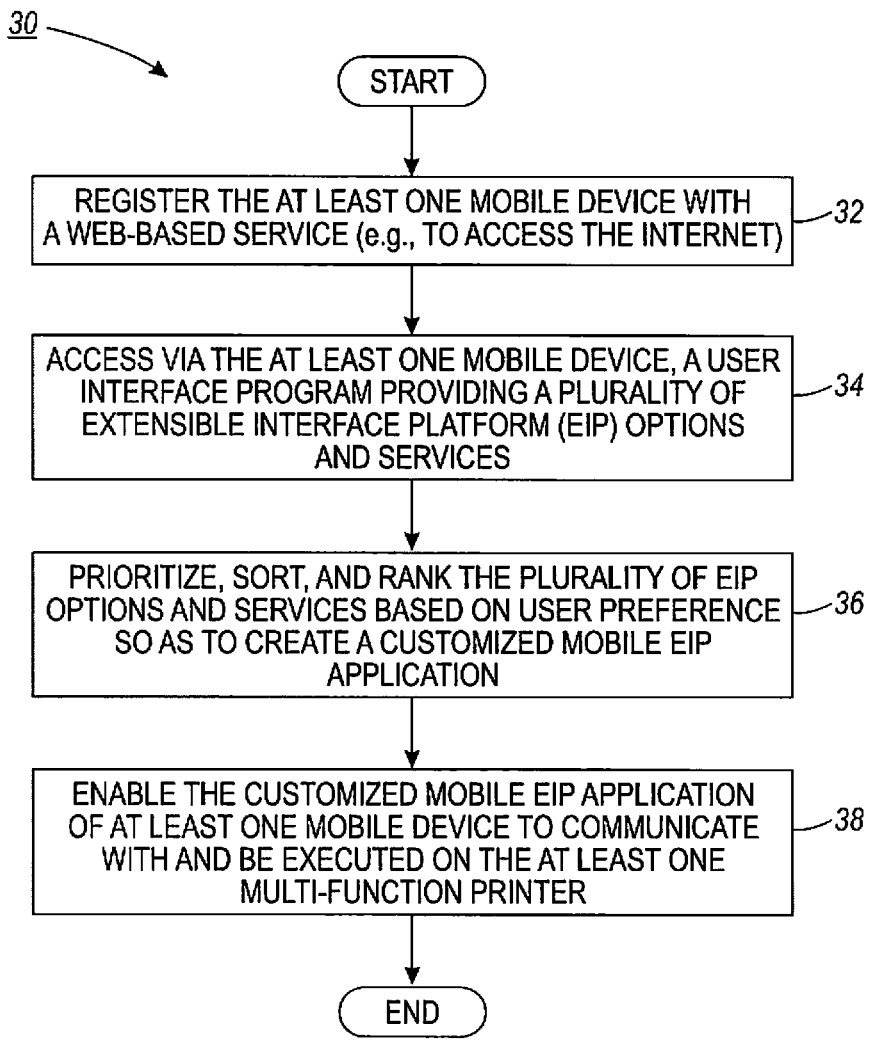
FIG. 3 illustrates a flowchart depicting communication between the custom mobile EIP UI of a mobile device with at least one multi-function device, in accordance with the present disclosure.

Referring to FIG. 3, a flowchart depicting communication between the custom mobile EIP UI of a mobile device with at least one multi-function device, in accordance with the present disclosure is presented.

The flowchart 30 includes the following steps. In step 32, the at least one mobile device is registered with a web-based service, such as the Internet or an Intranet. In step 34, a user interface program is accessed via at least one mobile device, the user interface program providing a plurality of EIP options and services. In step 36, the plurality of EIP options and services are prioritized, sorted, and ranked based on user preferences so as to create a customized mobile EIP UI. In step 38, the customized mobile EIP UI of at least one mobile device is enabled to communicate with and to be executed on at least one MFP. The process then ends for the first cycle or first iteration. However, the process may be a continuous iterative process. In other words, the steps of the process may repeat for a number cycles or iterations, where at least the registering, accessing, prioritizing, sorting, ranking, and communicating steps are constantly and continuously repeated.

In an exemplary embodiment, a user enters, for example, a FedEx® Office carrying a hard copy of a document and an Apple iPhone® and approaches an MFP with a QR Code affixed to the front of the MFP. The user may access the "Customized Mobile EIP" application from the iPhone®. Once the "Customized Mobile EIP" application loads, the user may select the "Add a Printer" option. The "Customized Mobile EIP" application may launch the camera software on the iPhone®. The user may aim the camera at the QR Code and take a picture. The "Customized Mobile EIP" application may submit the photographed QR Code to a cloud. The cloud may respond with the FedEx® Office branch's wireless network name, WPA password, the internal IP address of the specific MFP, and the friendly name of the MFP (e.g., "FedEx® MFP"). The IP address may be used later to call web services on the MFP from the mobile device's web browser. The user may then select the "Connect to Printer" option in the "Customized Mobile EIP" application and choose the "FedEx® MFP" option from the list of favorites.

The "Customized Mobile EIP" screen may change to display the user's custom EIP services screen showing several icons and labels, including the "Scan to MFP" service, which may involve redirecting control of the mobile UI to the web browser on the mobile device. The user may load his/her document into the feeder on the MFP and launch the "Scan to MFP" EIP application. The mobile device screen may change to show an EIP application that features, for instance, a simple, big, green "Start Scan" button. The user presses the button. The next screen in the "Scan to MFP" EIP application may display a message, such as, "Please Wait," and software or code is used to install a scan template on the MFP through a web service call. The template points to the user's repository in the cloud. The next screen in the "Scan to MFP" EIP application may display a message, such as, "Initiating Scan," and software or code may be used to initiate the scan on the MFP through a web service call. The next screen in the "Scan to MFP" EIP application may display a message, such as, "Waiting for MFP . . . " and uses a web service call to get the status of the scan from the MFP; if the scan is not complete, the screen refreshes. Once the scan is complete, the next screen in the "Scan to MFP" EIP application may display a message, such as, "Finishing up," and uses software or code to delete the scan template from the MFP. The next screen in the "Scan to MFP" EIP application may display a message, such as, "Scan Complete" briefly before redirecting the mobile device's web browser back to the user's custom EIP services screen.

Advantages of the present disclosure include at least the following: (i) the user need not register the service(s) with the specific MFP because once they are registered to the user's account, they appear on any mobile device from which the user has logged in, (ii) once a specific service is accessed via its icon, the screens are displayed in the browser on the user's mobile device (not the browser in the MFP local UI), and (iii) the EIP UI interacts with the basic functionality of the MFP by making web service calls to the specific IP address or host name of the MFP (not calls to "local host").

Embodiments as disclosed herein may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Additionally, "code" as used herein, or "program" as used herein, is any plurality of binary values or any executable, interpreted or compiled code which may be used by a computer or execution device to perform a task. This code or program may be written in any one of several known computer languages. The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

A service provider may be any entity that develops, offers, controls, manages, owns, alters and/or sells software and/or hardware products. A service provider may be any entity that performs one or more tasks on one or more pre-existing MFDs, which may or may not be controlled or owned by the service provider. For example, the entity may offer a service with an existing software package and/or with any type of existing Internet-based service through the Internet. In other words, a service provider need not own or provide the MFDs or MFPs. The MFDs or MFPs may be owned or provided by any third party not related or associated with the service provider. In the present disclosure, it is contemplated that the entity (such as a service provider) may offer any type of service and/or product to optimize pre-existing, pre-owned MFDs or MFPs by referring potential customers to an Internet website or a store that may or may not be associated with printing-related services and/or products. The term "entity" may refer to anything that may exist as a discrete and/or distinct unit that owns, operates, manages, and/or controls one or more of a plurality of machines or electronic devices (such as MFDs or MFPs). For example, the term "entity" may include the term "company."

Further, although aspects of the present disclosure have been described herein in the context of several particular implementations in particular environments for particular purposes, those of ordinary skill in the art will recognize that its usefulness is not limited thereto and that the present disclosure may be beneficially implemented in any number of environments for any number of purposes.

It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for enabling at least one mobile device to communicate with at least one multi-function printer over a network,
the system comprising:
at least one processor;
and a computer-readable storage medium in communication with the at least one processor,
wherein the computer-readable storage medium comprises one or more programming instructions for:
registering the at least one mobile device with a web-based service;
accessing, via the at least one mobile device, a user interface program providing a plurality of Extensible Interface Platform (EIP) options and services, wherein said plurality of EIP options and services can be purchased;
prioritizing, sorting, and ranking the plurality of purchased EIP options and services based on user preference for said registered mobile device so as to create a customized mobile EIP User Interface (UI);
enabling the customized mobile EIP UI of the at least one mobile device to communicate with and be executed on the at least one multi-function printer; and
collecting a history of option and service preferences associated with the customized mobile EIP of the registered mobile device;
evaluating said history of option and service preferences to anticipate likely future option and service preferences; and
ranking future preferences according to said evaluation of said history of option and services preferences.

2. The system according to claim 1, wherein the registering the at least one mobile device with said web-based service, further comprises at least creating an account uniquely identifying one or more users of the at least one mobile device, providing a username and password, and providing contact and billing information of the one or more users.

3. The system according to claim 2, wherein the plurality of EIP options and services include at least one or more of the following: adding multi-function printers, removing multi-function printers, browsing multi-function printers, designating default multi-function printers, and accessing multi-function printers.

4. The system according to claim 1, wherein the plurality of EIP options and services is created and uploaded by the one or more users.

5. The system according to claim 4, wherein the customized mobile EIP UI is transferred and shared between mobile devices commonly owned by a user.

6. The system according to claim 5, wherein, when the at least one mobile device communicates with the at least one multi-function printer over tile network, the customized mobile EIP mimics and cooperates with the plurality of EIP options and services provided by a user interface of the at least one multi-function printer.

7. The system according to claim 6, wherein a user interface of the at least one multi-function printer remains unaffected, when the plurality of EIP options and services are accessed via the customized mobile EIP of the at least one mobile device.

8. The system according to claim 4, wherein the customized mobile EIP UI of tile at least one mobile device communicates with the at least one multi-function printer via web-service calls to an Internet protocol (IP) address or host name of the multi-function printer; and
wherein the at least one multi-function printer is prioritized, sorted and ranked according to at least one of: type of paper; availability; queue capacity; energy requirements; and weighted resource attributes; and ink volumes.

9. A method for enabling at least one mobile device to communicate with at least one multi-function printer over a network, the method comprising:
registering the at least one mobile device with a web-based service; accessing, via the at least one mobile device, a user interface program providing a plurality of Extensible Interface Platform (EIP) options and services, wherein said plurality of EIP options and services can be purchased;
prioritizing, sorting, and ranking the plurality of EIP options and services based on user preference for said registered mobile device so as to create a customized mobile EIP User Interface (UI);

enabling the customized mobile EIP UI of the at least one mobile device to communicate with and be executed on the at least one multi-function printer and collecting a history of option and service preferences associated with the customized mobile EIP of the registered mobile device;

evaluating said history of option and service preferences to anticipate likely future option and service preferences; and ranking future preferences according to said evaluation of said history of option and services preferences.

10. The method according to claim 9, further comprising+ permitting the one or more users to create and upload the plurality of EIP options and services.

11. The method according to claim 10, further comprising transferring and sharing the customized mobile EIP UI between mobile devices commonly owned by a user.

12. The method according to claim 11, wherein, when the at least one mobile device communicates with the at least one multi-function printer over the network, the customized mobile EIP mimics and cooperates with the plurality of EIP options and services provided by a user interface of the at least one multi-function printer.

13. Tile method according to claim 12, wherein a user interface of the at least one multi-function printer remains unaffected, when the plurality of EIP options and services are accessed via the customized mobile EIP of the at least one mobile device.

14. The method according to claim 10, wherein the plurality of EIP options and services include at least one or more of the following: adding multi-function printers, removing multi-function printers, browsing multi-function printers, designating default multi-function printers, and accessing multi-function printers.

15. The method according to claim 9, further comprising enabling the customized mobile EIP UI of the at least one mobile device to communicate with tile at least one multi-function printer via web-service calls to an Internet protocol (IP) address or host name of the multi-function printer.

16. A communications network comprising:

a plurality of multi-function printer machines linked through the communications network; and a plurality of mobile devices in electrical communication with the plurality of multi-function printer machines, each of the plurality of mobile devices having a customized mobile Extensible Interface Platform (EIP) application created by allowing users to prioritize, sort, and rank a plurality of EIP options and services based on user preferences;

wherein the at least one multi-function printer is prioritized, sorted, and ranked according to at least one of:

type of paper;

availability;

queue capacity;

energy requirements;

and weighted resource attributes;

and ink volumes;

and wherein at least one of customized mobile EIP User Interfaces (UI) communicates with and is executed on at least one of the plurality of multi-function printer machines.

17. The communications network according to claim 16, wherein the customized mobile EIP UI is transferred and shared between the plurality of mobile devices and wherein, when at least one of the plurality of mobile devices communicates with at least one of the plurality of multi-function printer machines over the communications network, the customized mobile EIP mimics and cooperates with the plurality of EIP options and services provided by a user interface of the at least one multi-function printer machine of the plurality of multi-function printer machines.

18. The communications network according to claim 16, wherein, when at least one of tile plurality of mobile devices communicates with at least one of the plurality of multi-function printer machines over the communications network, the customized mobile EIP UI mimics and cooperates with the plurality of EIP options and services provided by a user interface of the at least one multi-function printer machine of the plurality of multi-function printer machines.

\* \* \* \* \*